(12) United States Patent
Shiffler, Jr. et al.

(10) Patent No.: US 6,645,628 B2
(45) Date of Patent: Nov. 11, 2003

(54) CARBON NANOTUBE COATED ANODE

(75) Inventors: Donald A. Shiffler, Jr., Albuquerque, NM (US); Michael D. Haworth, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/683,047

(22) Filed: Nov. 13, 2001

(65) Prior Publication Data

US 2003/0091825 A1 May 15, 2003

(51) Int. Cl.$^7$ ................................................. G32B 9/00
(52) U.S. Cl. ........................ 428/408; 257/79; 428/469
(58) Field of Search .............................. 428/408, 469; 257/79

(56) References Cited

U.S. PATENT DOCUMENTS

| | | | |
|---|---|---|---|
| 4,417,175 A | | 11/1983 | Curren et al. |
| 4,607,193 A | | 8/1986 | Curren et al. |
| 5,786,666 A | | 7/1998 | Lauf et al. |
| 5,916,642 A | * | 6/1999 | Chang |
| 6,265,466 B1 | * | 7/2001 | Glatkowski et al. |
| 6,322,713 B1 | * | 11/2001 | Choi et al. |
| 6,331,690 B1 | * | 12/2001 | Yudasaka et al. |
| 6,361,861 B2 | * | 3/2002 | Gao et al. |

FOREIGN PATENT DOCUMENTS

| | | | |
|---|---|---|---|
| EP | 1020888 A | | 7/2000 |
| EP | 1276132 | * | 1/2003 |

OTHER PUBLICATIONS

Vigolo, Brigitte, et. al, "Macroscopic fibers and ribbons of oriented carbon nanotubes," Science, vol. 290, pp. 1331–1334, Nov. 17, 2000.

Baughman, Ray, et. al, "Carbon nanotube actuators," Science, vol. 284, pp. 1340–1344, May 21, 1999.

* cited by examiner

Primary Examiner—Archene Turner
(74) Attorney, Agent, or Firm—James M. Skorich; Kenneth E. Callahan

(57) ABSTRACT

A vacuum tube having its anode/collector coated with carbon nanotube-based material in which five percent or more of the carbon nanotubes are aligned parallel to the anode/collector's surface.

12 Claims, 2 Drawing Sheets

Coated Anode at 475 kV

Un-Coated Anode at 475 kV

Coated Anode at 475 kV

CARBON NANOTUBE COATED ANODE

FEDERAL RESEARCH STATEMENT

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF INVENTION

The invention is in the field of vacuum tubes, and more particularly relates to a coated anode designed to reduce out-gassing, plasma formation, and secondary electron production.

Every vacuum electronics device, ranging from radio frequency tubes to microwaves tubes, must have some region in which the cathode emitted electrons impact after participating in the desired interactions. Generally these structures consist of stainless steel, oxygen free high conductivity (OFHC) copper or some other metal. Occasionally the metal is coated with an insulating material such as titanium nitride. Metals are generally the optimum structures due to the good electrical and thermal conductivity as well as the superior vacuum performance.

One major drawback with these materials is the production of secondary electrons, plasmas, and neutral gasses upon electron impact. Neutral gasses contribute to raising the pressure in the tube, reducing the vacuum. Plasmas not only increase the pressure but also cause the tube to short electrically, limiting the duration of microwave or radio frequency output. Plasmas can also cause damage other components, e.g., the cathode or other metallic structures. Secondary electrons are electrons produced by the impact of the primary electron beam. A single primary electron can produce several or as many as hundreds of secondary electrons. These secondary electrons then cause the formation of plasmas and result in further out-gassing from the metal anode or collector.

These problems are amplified when the collector is biased to allow energy recovery from the primary electron beam. Here, the secondary electrons can easily be re-accelerated back into the collector, causing a cascading process producing more secondary electrons. One method to reduce this effect is to coat the anode/collector with a carbon film. The carbon reduces, but does not eliminate the effects discussed above.

Accordingly, there is a need for an anode/collector that can significantly reduce the production of secondary electrons, plasma formation, and out-gassing of neutral gases.

SUMMARY OF INVENTION

In a preferred embodiment, the anode/collector surface of a vacuum tube is coated with a carbon nanotube material having the longitudinal axis of at least a portion of the nanotubes running parallel to the surface. The anode/collector surface initially is comprised of carbon or a metal surface coated with a thin film of carbon. It is then coated with a carbonizable resin. The final coating can be a carbon nanotube felt-like material that is pyro-bonded to the anode surface, or nanotubes can be deposited on the anode by chemical vapor deposition or by evaporation and then pyro-bonded.

Other aspects and advantages of the present invention will become apparent from the following detailed description, taken in conjunction with the accompanying drawing, illustrating by way of example the principles of the invention.

DETAILED DESCRIPTION

Figure 1:
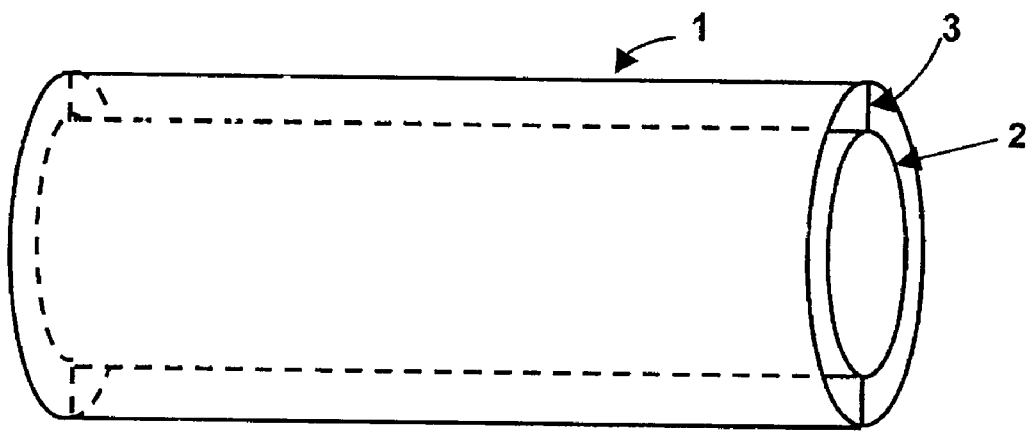
FIG. 1 illustrates a typical cylindrical anode/cathode configuration.

Conventional vacuum tube anodes/collectors produce secondary electrons from the impact of electrons from the cathode, along with plasmas and neutral gasses that degrade the performance of the tube. The carbon nanotube anode coating of the present invention significantly reduces these problems.

Carbon nanotubes are very small tube-shaped molecules having the structure of a graphite molecule rolled into a tube. Nanotubes have high conductivity along their longitudinal direction (z) and low conductivity in the transverse (r) direction. The carbon bonds are such that electrons are tightly bound in the p-orbits in the transverse direction and not readily dislodged. Thus, an anode coated with a carbon nanotube material that has at least a portion of the nanotubes lying parallel to the anode surface will produce few secondary electrons. Processes for fabricating single-walled carbon nanotubes into fibers and ribbon-like materials with preferentially oriented nanotubes are known in the art (Vigolo, Brigitte, et. al, "Macroscopic Fibers and Ribbons of Oriented Carbon Nanotubes," Science, Vol. 290, pp. 1331–1334, 17 November 2000).

Nanotubes can be placed on an anode/collector surface coated with a carbonizable resin using chemical vapor deposition (CVD) or evaporation. (Carbon nanotubes are commercially available in powder form from Carbon Nanotechnologies, Inc., of Houston, Tex.) After the nanotubes have been deposited, the coating is then pyro-bonded to the anode/collector surface.

First, a carbon surface or a metal surface coated with a thin film of carbon is obtained in the shape of the desired anode. The electron impact surface is then coated with a carbonizable resin. A carbonizable resin, e.g. phenolic, is any resin that when heated sufficiently hot leaves only carbon in a solid state, generally a powder. The carbon nanotubes can be secured to the anode/collector surface using CVD onto the surface, which has been coated with a carbonizable resin.

The anode/collector part is then baked to greater than 700° centigrade in a non-oxidizing atmosphere, decomposing the resin, and releasing volatile components. A porous carbon "char" residue embedded with carbon nanotubes is left on the surface. Next, chemical vapor deposition (CVD) is used to infiltrate carbon into the porous char, creating a non-porous, rigid surface. This pyrocarbon material coating consists of a layer of carbon derived using pyrolysis through chemical vapor deposition (CVD). Pyrolysis through CVD is a process in which a low pressure hydrocarbon gas, methane for example, flows onto the part to be coated, is thermally decomposed, and deposits carbon on the part while releasing hydrogen. In particular, the carbonized part is heated to over 1000° centigrade while a low-pressure hydrocarbon gas is flowed onto it. The gas thermally decomposes, depositing carbon layers and releasing hydrogen. The length of the process depends on the size of the part to be coated, the number of layers required, and the gas flow rate. The thickness of the CVD film added depends on the thickness of the carbon nanotube coating, which depends on the degree of reduction required. The degree of reduction required depends on the exact parameters of the device to be used. The entire assembly is then placed in a vacuum bakeout at over 100° centigrade to remove any remaining water. The coating retains sufficient conductivity to conduct the incident electrons to the remainder of the pulsed circuit.

Carbon nanotubes can also be produced in a "felt" material, in which a significant portion of the nanotubes that form the fabric of the felt lie in the plane of the material. The felt consists of a polymer fabric into which ribbon-like carbon nanotube strips have been woven. (The source of this felt material is Dr. Otto Chou, Physics and Astronomy Department, University of North Carolina at Chapel Hill.) First, a carbon surface or a metal surface coated with a thin film of carbon is obtained in the shape of the desired anode. The electron impact surface is then coated with a carbonizable resin as previously described. The felt can be secured to the anode/collector surface by placing the felt on the surface which has been coated with a carbonizable resin and then heating the entire structure to greater than 1000° C. The felt is thus pyro-bonded to the anode/collector surface, forming a coating.

Figure 2:
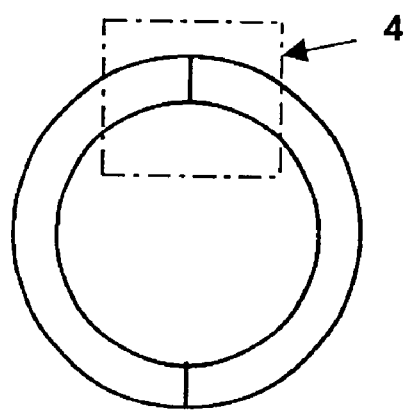
FIG. 2 is an end view of the cylindrical anode/cathode of FIG. 1.

A significant reduction in secondary electrons was measured for carbon nanotube material having as little as five percent of the nanotubes parallel to the anode surface. At the same time, the cathode-produced elect are conducted away by the anode parallel to the anode surface. Plasmas that normally would form due to secondary electron emission at 80 keV electron energies did not form until the electron energy exceeded 475 keV. For example, an anode structure having a cylindrical geometry is depicted in FIG. 1 with an end view shown in FIG. 2. A cathode 2 emits electrons that are accelerated to high energy towards the anode/collector 1. The cylindrical cathode is held in position within the cylindrical anode by a support 3. Electrons impact the anode at very high energy, leading to the production of neutral gas, plasma, and secondary electrons.

Figures 3, 4:
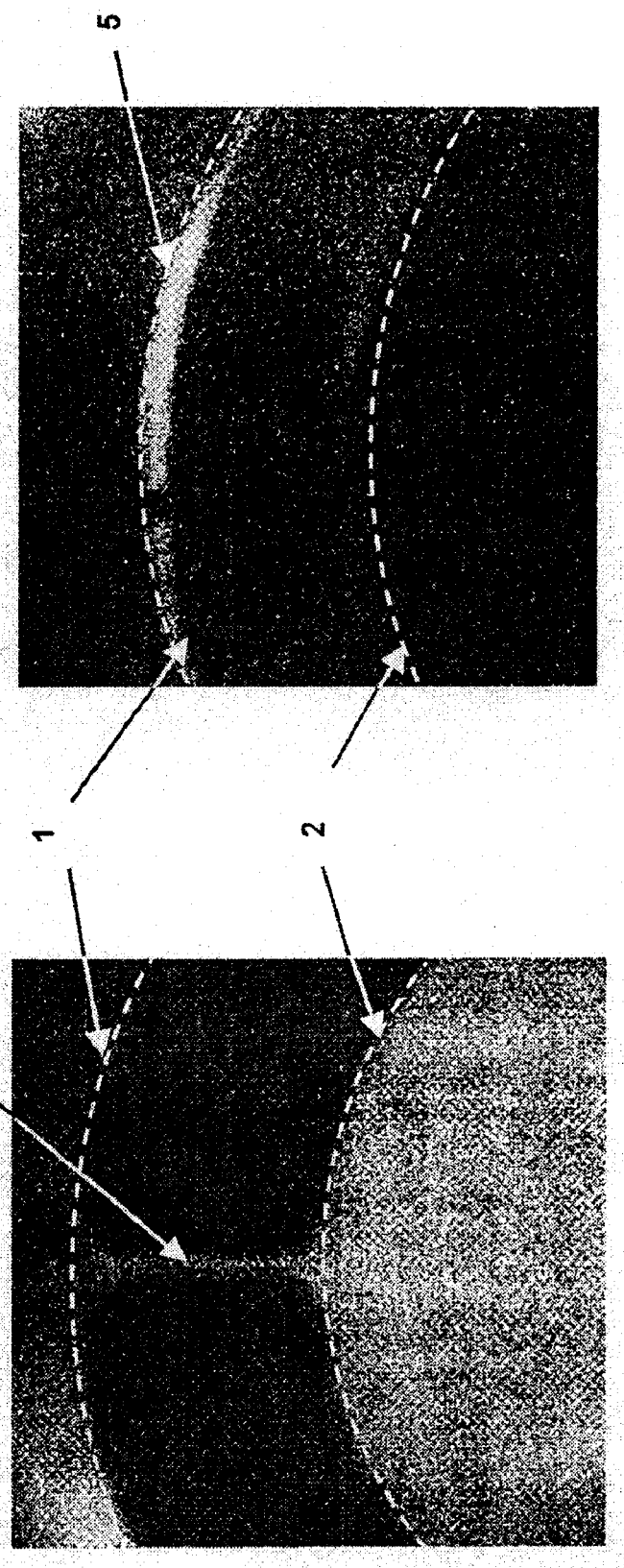
FIG. 3 is an end view of a portion of the cylindrical anode/cathode at 475 kV with the anode coated.
FIG. 4 is a low gain end view of a portion of the cylindrical anode/cathode at 475 kV with an uncoated anode.

FIG. 3 is a scanned photograph of a portion of the cylindrical anode/cathode (approximately encompassed by the FIG. 2 dashed line 4) where the anode 1 has been coated with the carbon nanotube material as described above. The potential difference between the cathode and the anode is 475 kV. No plasma formation can be seen. For comparison, the same cylindrical anode/cathode at 475 kV is shown in FIG. 4 but with an uncoated anode. This low-gain photo clearly shows the plasma formation 5. The plasma brightness in FIG. 4 necessitated the much-reduced gain of FIG. 4 relative to FIG. 3.

The carbon nanotube-based anode/collector coating has several advantages over previous metals and coatings. This coating can be used in high and low vacuum. The coating can be applied in a complex range of shapes. Secondary electron production, neutral gas (out-gassing) production, and plasma production are greatly reduced, permitting microwave and radio frequency vacuum electronics to be run with higher efficiency due to lower pumping requirements. Many devices have been limited in peak power and pulse duration by these effects. These coated anodes have applications ranging from cathode ray tubes in computers, televisions, and displays to microwave tubes in radar, communications, and cooking.

What is claimed is:

1. An anode assembly for reducing production of secondary electrons, comprising:

an anode;

a plurality of carbon nanotubes coating the anode;

each of the nanotubes having a longitudinal axis;

each of the nanotubes being comprised of sections, and each section lying proximate to a local surface of the anode; and a plurality of sections having longitudinal axes lying parallel to their respective local surfaces.

2. An anode assembly as defined in claim 1 wherein the nanotubes are woven into a nanotube fabric.

3. An anode assembly as defined in claim 1 wherein the nanotubes are hollow.

4. An anode assembly as defined in claim 1 wherein the nanotubes are pyro-bonded to the anode.

5. An anode assembly as defined in claim 1 wherein:

each longitudinal axis has a length;

the longitudinal axis for each section has a section length;

the nanotubes have a collective longitudinal axis length equal to a sum of the lengths of the longitudinal axes; and at least 5% of the collective longitudinal axis length is comprised of section lengths for sections having longitudinal axes lying parallel to their respective local surfaces.

6. An anode assembly as defined in claim 1 wherein:

each of the nanotubes has a transverse axis;

each of the nanotubes has a transverse electrical conductivity along the transverse axis and a longitudinal electrical conductivity along the longitudinal axis; and the longitudinal electrical conductivity is greater than the transverse electrical conductivity, whereby a majority of electrons being conducted by the nanotubes are conducted in parallel with the local surfaces.

7. An anode assembly as defined in claim 1 wherein the anode is comprised of a carbon film surrounding a metal substrate.

8. An anode assembly as defined in claim 1 wherein the anode is comprised of carbon.

9. An anode assembly defined in claim 1 wherein:

the anode includes an electron impact area; and the nanotubes cover the electron impact area.

10. An anode assembly as defined in claim 1 wherein:

the anode includes a surface; and the longitudinal axes are nonorthogonal to the surface.

11. An anode assembly as defined in claim 1 wherein the longitudinal axes of the sections are nonorthogonal to the respective local surfaces.

12. The felt material as defined in claim 11 wherein the fabric is a polymer.

* * * * *